United States Patent
Liao

(10) Patent No.: US 8,919,386 B2
(45) Date of Patent: Dec. 30, 2014

(54) CLAMPING APPARATUS FOR STOPPING A TUBE

(76) Inventor: Ying-Chieh Liao, Taichung (TW)

(*) Notice: Subject to any disclaimer, the term of this patent is extended or adjusted under 35 U.S.C. 154(b) by 345 days.

(21) Appl. No.: 13/551,484

(22) Filed: Jul. 17, 2012

(65) Prior Publication Data

US 2014/0020780 A1 Jan. 23, 2014

(51) Int. Cl.
*F16L 55/10* (2006.01)
*F16L 55/11* (2006.01)

(52) U.S. Cl.
CPC *F16L 55/11* (2013.01); *F16L 55/10* (2013.01)
USPC ............................................. 138/89; 138/92

(58) Field of Classification Search
CPC ............ F16L 55/11; F16L 55/10; F16B 2/10; F16J 15/02; B25B 5/06
USPC ....................................... 138/89, 92
See application file for complete search history.

(56) References Cited

U.S. PATENT DOCUMENTS

| 5,249,604 | A | * | 10/1993 | Keating | 138/89 |
| 5,351,932 | A | * | 10/1994 | von Herrmann | 251/4 |
| 5,560,388 | A | * | 10/1996 | Caldwell | 137/15.15 |
| 8,522,826 | B1 | * | 9/2013 | Shih | 138/89 |
| 2007/0095397 | A1 | * | 5/2007 | Mazur | 137/317 |
| 2012/0266422 | A1 | * | 10/2012 | Galota et al. | 24/569 |
| 2013/0186500 | A1 | * | 7/2013 | Chen | 138/89 |
| 2013/0241159 | A1 | * | 9/2013 | Mateo | 277/637 |
| 2013/0313450 | A1 | * | 11/2013 | Chen | 251/8 |

FOREIGN PATENT DOCUMENTS

FR 2988086 A1 * 3/2012 ............... B67D 7/78

* cited by examiner

*Primary Examiner* — Paul R Durand
*Assistant Examiner* — Jeremy W Carroll

(57) ABSTRACT

A clamp apparatus includes seat and a stopper. The stopper is force toward the seat by an elastic member, so that the stop and the seat are able to clutch and stop a tube or a multi-way valve. The seat is provided with a detachable holder which clips or presses on the tube or the multi-way valve. Thus, by interchanging the holder with another holder, the clip can fit with sizes of tubes and multi-way valves. Application of the clamp apparatus is expended with minimal accessories.

17 Claims, 5 Drawing Sheets

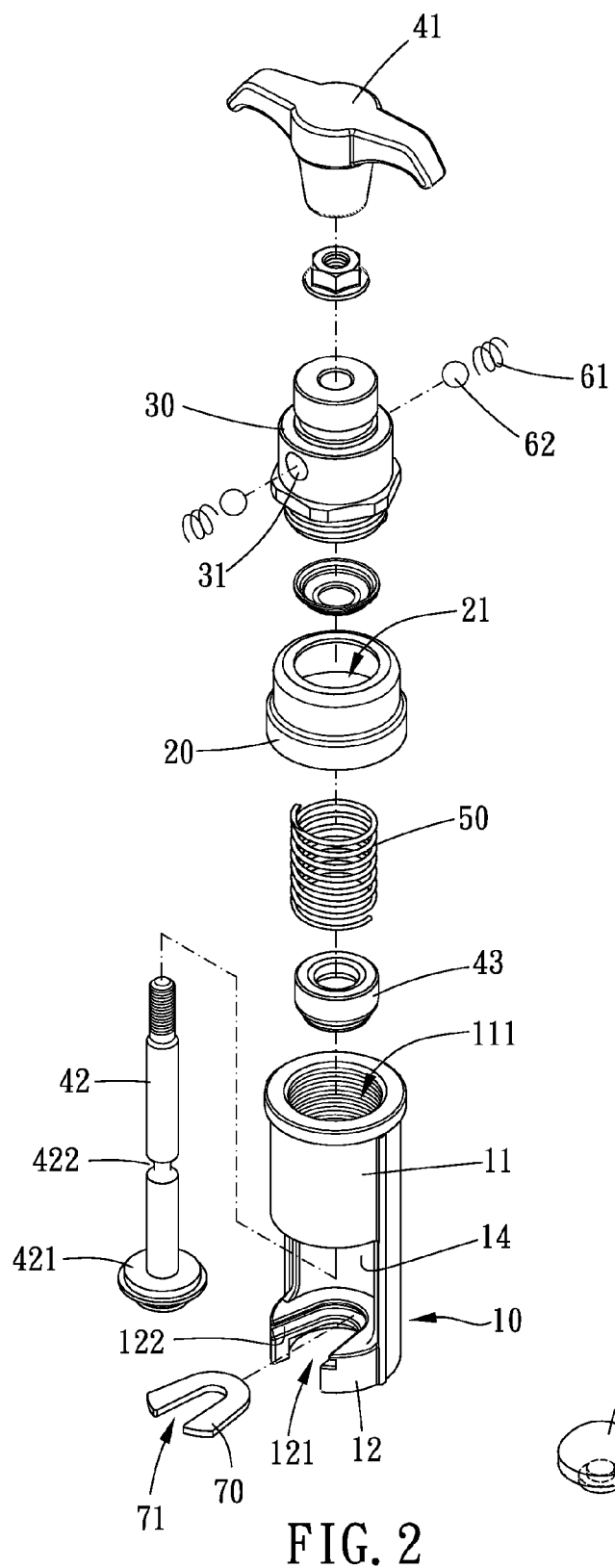
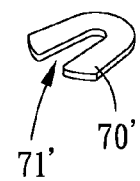
FIG. 2A
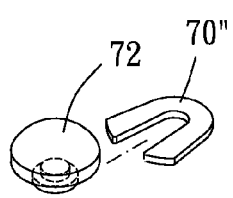
FIG. 2
FIG. 2B

CLAMPING APPARATUS FOR STOPPING A TUBE

BACKGROUND OF THE INVENTION

1. Field of the Invention

The present invention relates to a clamp for stopping a tube or a multi-way valve.

2. Description of the Prior Art

Tubes and multi-way valves are frequently utilized in connecting machines for transporting liquid or gas. For servicing the machines, these tubes and multi-way valves shall be temporarily sealed, or gas or liquid would spray out. Therefore, clamp for stopping tubes is a common tool, such as disclosed in TWD142958.

However, diameters of the tubes and the multi-way valves are different from one another. A considerable amount of clamps have to be prepared for fitting with sizes of the tubes. Thus, the cost for servicing is increased.

Tube clamp is then provided for fitting with sizes of tubes. However, the clamp has to be fixed and mounted to the tube with specialized tools. Manipulation of the clamp is difficult and complicated.

The present invention is, therefore, arisen to obviate or at least mitigate the above mentioned disadvantages.

SUMMARY OF THE INVENTION

The main object of the present invention is to provide an operation-friendly clamp for stopping sizes of tubes.

To achieve the above and other objects, a clamp apparatus of the present invention includes a main body, a stopper, and a holder.

One end of the main body is formed as a sheath, and another end of the main body is formed as a seat. The sheath and the seat define an operation space. The sheath has a vertical hole. The hole communicates with the operation space. The seat is formed with an opening The opening extends laterally and approaches a lateral side of the seat. The seat is formed with a positioning groove which extends along an appearance of the opening and locates at a side wall of the opening The positioning groove has a top wall and a bottom wall.

The stopper is movably inserted through the hole. A plug is disposed on one end of the stopper.

The holder is detachably and slidably disposed between the top wall and the bottom wall of the positioning groove.

Therefore, by only interchanging the holder with another holder, the clip can fit and stop sizes of tubes and multi-way valves. Operation-friendly clamp apparatus for stopping sizes of tubes is provided.

The present invention will become more obvious from the following description when taken in connection with the accompanying drawings, which show, for purpose of illustrations only, the preferred embodiment(s) in accordance with the present invention.

BRIEF DESCRIPTION OF THE DRAWINGS

FIG. 2 is a breakdown drawing showing a first embodiment of the present invention;

FIG. 2A is a stereogram showing a holder which is formed with a smaller opening;

FIG. 2B is a breakdown drawing showing a holder which has a plug disposed thereon;

DETAILED DESCRIPTION OF THE PREFERRED EMBODIMENTS

Figure 1:
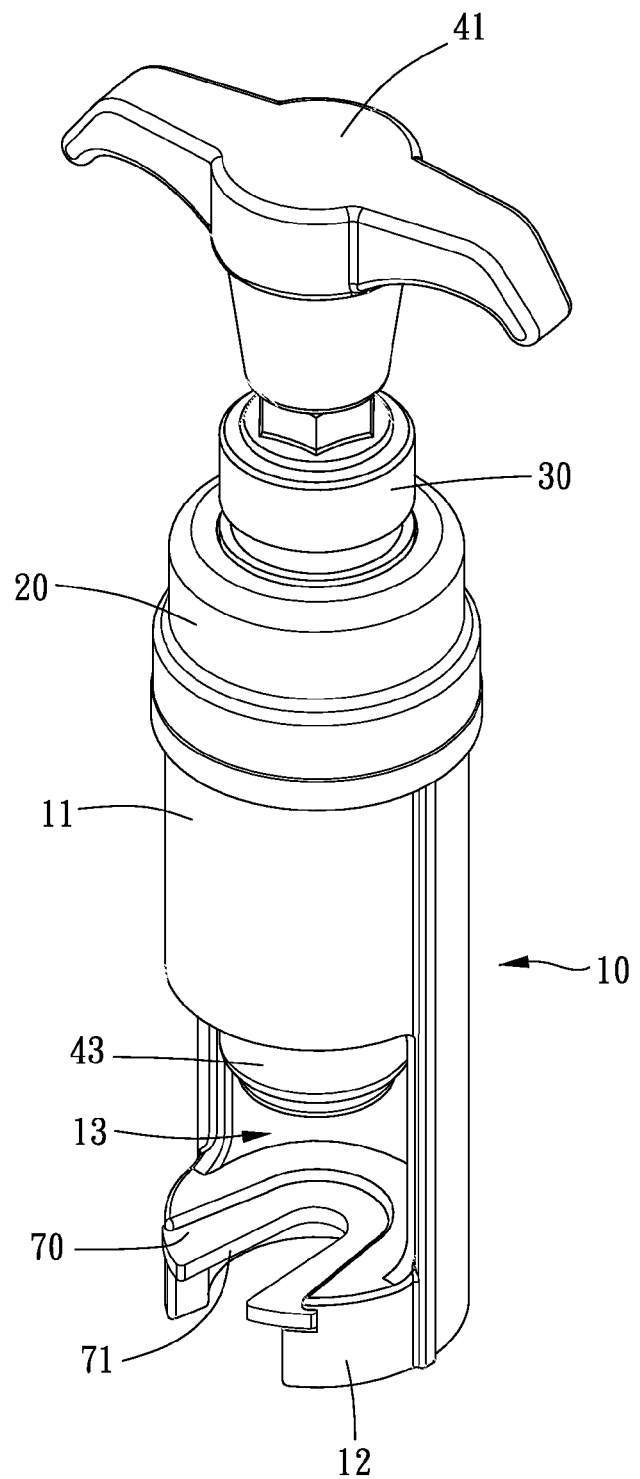
FIG. 1 is a stereogram showing a first embodiment of the present invention.
Figure 3:
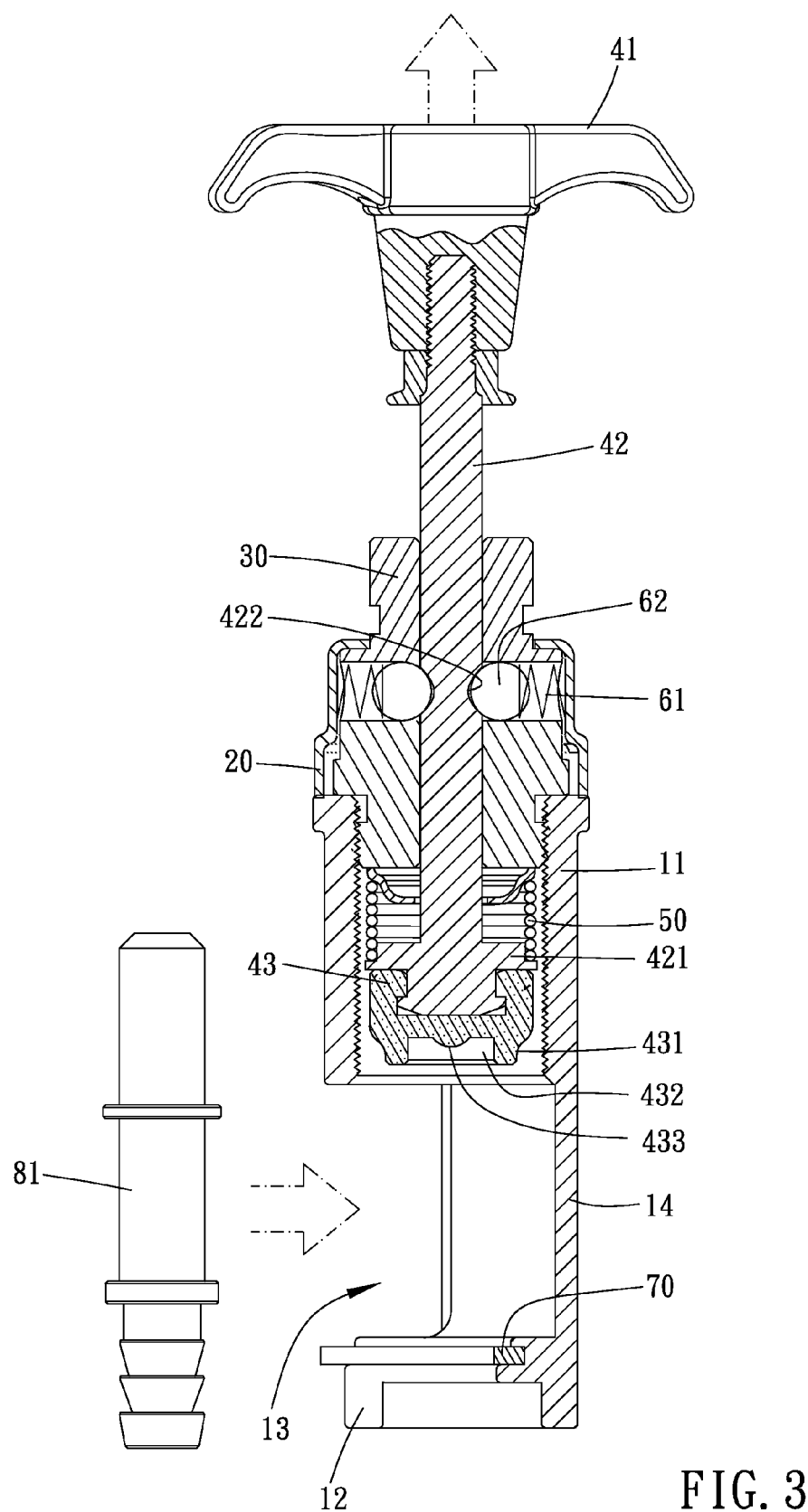
FIG. 3 is a profile showing a first embodiment of the present invention.

Please refer to FIG. 1 to FIG. 3 for a first embodiment of the present invention. The clamp apparatus for stopping a tube of the present embodiment includes a main body 10, a cover 20, a supporter 30, a stopper, a first elastic member 50, two restriction structures, and several holders 70, 70', 70".

One end of the main body 10 is formed as a sheath 11. The other end of the main body 10 is formed as a seat 12. An operation space 13 is defined between the sheath 11 and the seat 12. More specifically, the main body 10 is provided with a tubular appearance. The tubular main body 10 is formed with a rip shown as the operation space 13, so that the sheath 11 and the seat 12 are divided and formed at two end of the main body 10. A connection wall 14 connects the sheath 11 to the seat 12, so that the sheath 11 and the seat 12 are still provided in single piece. The sheath 11 has a tubular appearance and a vertical hole 111. The vertical hole 111 communicates with the operation space 13. The seat 12 is formed with an opening 121. The opening 121 extends laterally and approaches a lateral side of the seat 12. More specifically, the opening 121 extends and approaches the lateral side which is located away from the connection wall 14. In the present embodiment, the opening 121 and the seat 12 are provided in U-shaped. The seat 12 is formed with a positioning groove 122 which extends along an appearance of the opening 121 and locates at a side wall of the opening 121. The positioning groove 122 has a top wall and a bottom wall.

The cover 20 is disposed on one end of the sheath 11 where is located away from the seat 12. The cover 20 defines a receiving space 21. The receiving space communicates with the hole 111.

The supporter 30 is disposed in the hole 111 and mates with the sheath 11 by threads. The supporter 30 is partially received in the receiving space 21. The supporter 30 is formed with two apertures 31 which extend radially.

Figure 4:
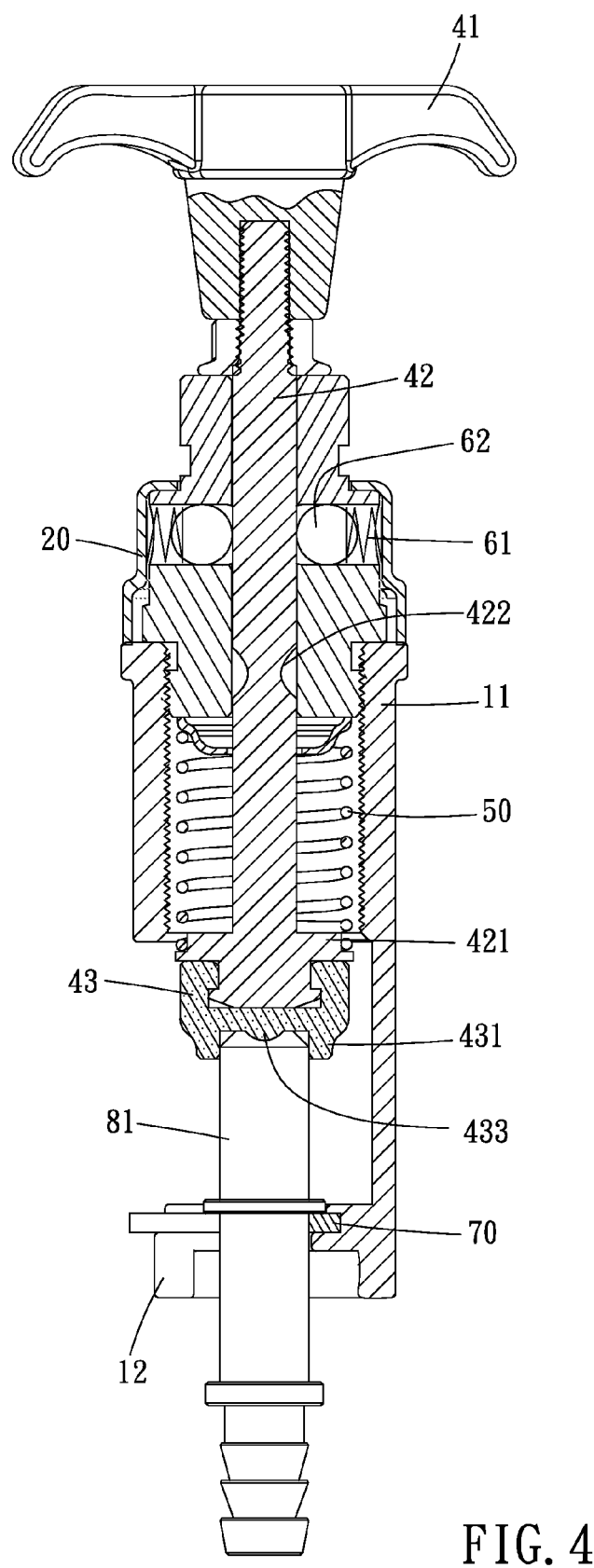
FIG. 4 is a profile showing an operation condition of a first embodiment of the present invention, wherein one end of a tube is obstructed.
Figure 5:
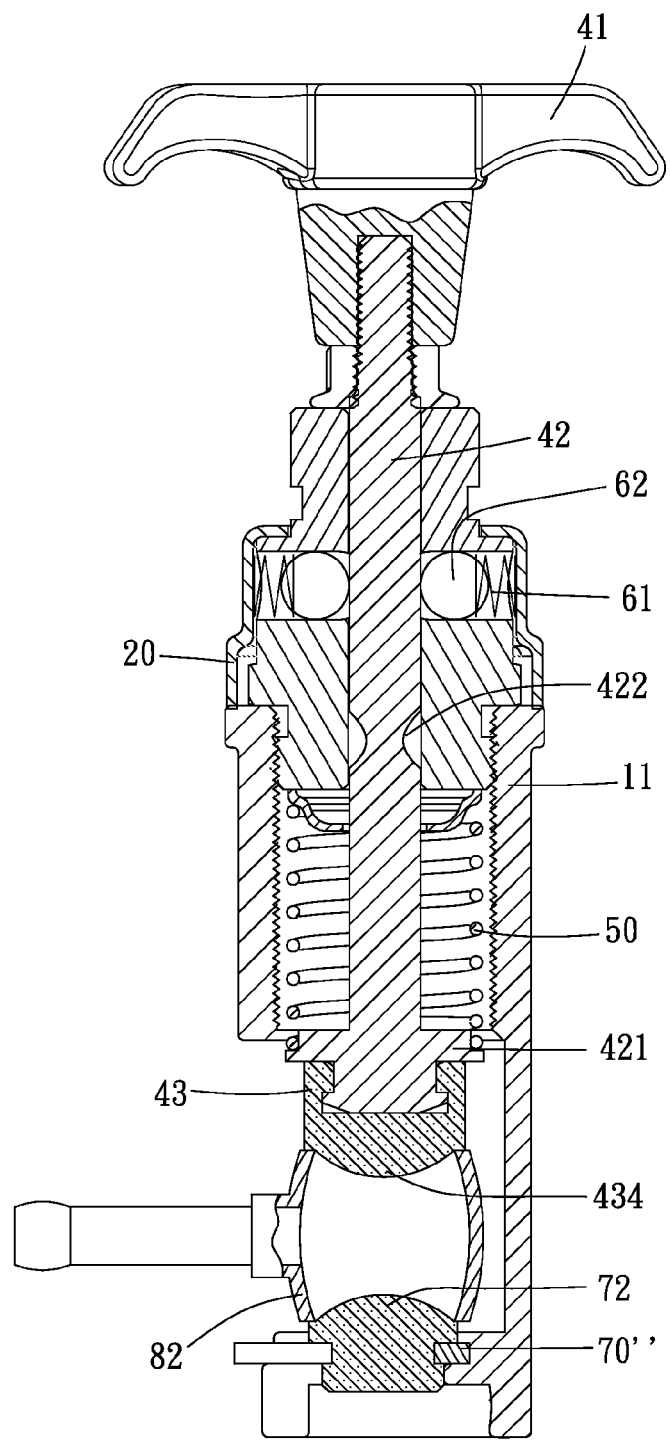
FIG. 5 is a profile showing a second embodiment of the present invention, wherein two openings of a multi-way valve are obstructed.

The stopper includes a handle 41, a rod 42, and a plug 43. The handle 41 is disposed on one end of the rod 42. The rod 42 is movably inserted through the supporter 30 and the hole 111. An abutting portion 421 is disposed on the rod 42. The rod 42 is further formed with an annular groove 422. The plug 43 is disposed on the other end of the rod 42 which locates away from the handle 41. Corresponding to the tube or the multi-way valve the clamp fitting with, the plug 43 may be provided with a circular protrusion 431, as shown in FIG. 3 and FIG. 4. The circular protrusion 431 defines a leakage prevention groove 432. Preferably, a protrusion 433 is disposed on a bottom portion of the leakage prevention groove 432. In another embodiment, the plug 43 may be provided with only one protrusion 434 directly, as shown in FIG. 5.

The first elastic member 50 sleeves on the rod 42 of the stopper. One end of the first elastic member 50 abuts against the supporter 30. The other end of the first elastic member 50 abuts against the abutting portion 421 of the stopper. Thus, the first elastic member 50 is located in the hole 111. The elastic member provides an elastic force pressing on the abutting portion 421, so that the stopper is generally forced toward the seat 12.

The restriction structures are disposed in the apertures 31 respectively. The restriction structures are used for restricting motion of the stopper moving away from the seat 12. Therefore, moving distance of the stopper away from the seat 12 is limited. In the present embodiment, each restriction structure includes a second elastic member 61 and a bead 62. One end of the second elastic member 61 abuts against the cover 20, and the other end abuts against the bead 62. The second elastic member 61 provides an elastic force, pressing on the bead 62. Thus, the bead 62 is generally forced toward the rod 42 of the stopper.

The holders 70, 70', 70" are detachably and slidably disposed between the top wall and the bottom wall of the positioning groove 122. It is noted that only one of the holders is disposed in the positioning groove 122. The others are prepared for interchanging. More specifically, each of the holders 70, 70', 70" has an appearance corresponding to the appearance of the positioning groove 122. In the present embodiment, the positioning groove 122 is formed U-shaped. The holders 70, 70', 70" are provided with U-shaped appearance, also. A thickness of any one of the holders is equal to a distance between the top wall and the bottom wall of the positioning groove 122. Thus, the holders 70, 70', 70" can be put and positioned in the positioning groove 122 easily via the opening of the positioning groove 122. Regarding to the holder 70, 70', 70", the holders 70, 70' are formed with openings 71, 71' for clipping. The openings 71, 71' have widths different from each other. The width of the opening 71 is larger than the width of the opening 71', as shown in FIG. 2 and FIG. 2A. The width of the opening 121 is larger than the widths of the openings 71, 71'. Thus, the holder 70 is slightly exposed from the positioning groove 122, as shown in FIG. 1. The holders 70, 70' are then provided for clipping and holding sizes of tubes. Each of the holders 70, 70' has a U-shaped appearance or other suitable appearances. The holder 70" has a plug 72 disposed thereon, as shown in FIG. 2B and FIG. 5. The plug 72 can be interchanged with another plug which has a random or predetermined size. The holders 70, 70', 70" are able to be slidably disposed in the positioning groove 122, and are interchangeable with one another.

For fitting and stopping a tube 81, the holder 70 which has an opening 71 is chosen and assembled in the clamp apparatus. The opening 71 of the chosen holder 70 has a size corresponding to the size of the tube 81. Please refer to FIG. 3, the handle 41 is firstly pulled upwardly. The rod 42 is then drawn up until the beads are received in the annular groove. The first elastic member 50 is then compressed by the abutting portion 421, storing elastic force. By the force provided from the second elastic members, the beads press on the rod 42 and the annular groove, so that the stopper is temporarily stock, unable to move toward the seat. The tube 81 is then received and held in the opening of the holder 70, as shown in FIG. 4. Pressing down the stopper and forcing the beads 62 leave the annular groove 422. The rod 42 is then driven toward the seat by the elastic force of the first elastic member 50. The plug 43 which is disposed on the end of the rod 42 presses on the tube 81. Thus, the tube 81 is sealed and stopped by the protrusion 433. In addition, the circular protrusion 431 holds the periphery of the tube 81. As such, the tube is stopped by the clamp apparatus, and leakage is prohibited.

For fitting and stopping a multi-way valve 82, as shown in FIG. 5, the holder 70" which has a plug 72 is chosen and assembled in the clamp apparatus. The plug 72 is sized corresponding to the multi-way valve 82. Additional, the plug 43 which has a single protrusion 434 is chosen. By the similar manipulation mentioned above, the protrusion 434 and the plug 43 can press against and seal two orifices of the multi-way valve 82 with the elastic force provided by the first elastic member. As such, the multi-way valve is stopped by the clamp apparatus, and leakage is prohibited, also.

Accordingly, the holder of the clamp apparatus is changeable since the seat is formed with an opening and a positioning groove. To fit sizes of tubes or multi-way valves, user can interchange the holder with another holder which has a different size. Sizes and types of holders and plugs are prepared with one clamp apparatus for different work conditions. Application of the clamp apparatus is expanded, and the cost of servicing is minimized.

In addition, for interchanging the holder, the holder is slidably received in the positioning groove. Detachment and replacement of the holders is easily. Manipulation condition of the clamp apparatus is improved.

Beside, the stopper is generally force toward the seat. Thus, the stopper can seal the tube or the multi-way valve automatically. It is not necessary to grab the clamp apparatus continuously. Unexpected release of the clamp apparatus and accidental leakage is prohibited.

What is claimed is:

1. A clamping apparatus for stopping a tube, comprising:
   a main body, one end of the main body being formed as a sheath, another end of the main body being formed as a seat, the sheath and the seat defining an operation space, the sheath having a vertical hole, the hole communicating with the operation space, the seat being formed with an opening, the opening extending laterally and approaching a lateral side of the seat, the seat being formed with a positioning groove which extends circumferentially along a side wall of the opening, the positioning groove having a top wall and a bottom wall;
   a stopper, movably inserted through the hole, a plug being disposed on one end of the stopper;
   at least two holders each of which is interchangeable with the other for being slidably received in the positioning groove, one of the at least two holders being detachably and slidably disposed between the top wall and the bottom wall of the positioning groove.

2. The clamping apparatus of claim 1, wherein each holder is formed with an opening for clipping, each of the openings of the holders has a width different from a width of the other, and each of the holders has a U-shaped appearance.

3. The clamping apparatus of claim 2, wherein a width of the opening of the seat is larger than the widths of the openings of the holders.

4. The clamping apparatus of claim 1, wherein the holders includes a holder which is formed with an opening for clipping and a holder which has a plug disposed thereon.

5. The clamping apparatus of claim 1, wherein each of the holders has a shape corresponding to a shape of the positioning groove.

6. The clamping apparatus of claim 1, wherein a thickness of either of the holders is equal to a distance between the top wall and the bottom wall of the positioning groove.

7. The clamping apparatus of claim 1, wherein the clamping apparatus further comprises a supporter and a first elastic member, the supporter is disposed in the vertical hole, an abutting portion is disposed on the stopper, the first elastic member sleeves on the stopper, one end of the first elastic member abuts against the supporter, another end of the first elastic member abuts against the abutting portion of the stopper, the first elastic member provides an elastic force, so that the stopper is generally forced toward the seat.

8. The clamping apparatus of claim 7, wherein the clamping apparatus further comprises a restriction structure and a cover, the cover is disposed on one end of the sheath which locates away from the seat, a receiving space is defined in the cover, the supporter is partially received in the receiving space, the stopper is movably inserted through the supporter and the vertical hole;

wherein the supporter is formed with a radial aperture, the restriction structure is disposed in the radial aperture;

wherein the stopper is formed with an annular groove, the restriction structure comprises a second elastic member and a bead, one end of the second elastic member abuts against the bead, another end of the second elastic member abuts against the cover, so that the bead is generally forced toward the stopper, motion of the stopper moving away from the seat is restricted by the bead when the bead is partially received in the annular groove.

9. The clamping apparatus of claim 1, wherein the plug which is disposed on one end of the stopper is formed with a circular protrusion, the circular protrusion defines a leakage prevention groove, a protrusion is disposed on a bottom portion of the leakage prevention groove.

10. A clamping apparatus for stopping a tube, comprising:
a main body, one end of the main body being formed as a sheath, another end of the main body being formed as a seat, the sheath and the seat defining an operation space, the sheath having a vertical hole, the hole communicating with the operation space;
a stopper, movably inserted through the hole, a plug being disposed on one end of the stopper, an abutting portion being disposed on the stopper;
a supporter, disposed in the vertical hole;
a first elastic member, sleeving on the stopper, one end of the first elastic member abutting against the supporter, another end of the first elastic member abutting against the abutting portion of the stopper, the first elastic member providing an elastic force, so that the stopper is generally forced toward the seat;
wherein the seat is formed with an opening, the opening extends laterally and approaches a lateral side of the seat, the seat is formed with a positioning groove which extends circumferentially along a side wall of the opening, the positioning groove has a top wall and a bottom wall, the clamping apparatus further comprises at least two holders each of which is interchangeable with the other for being slidably received in the positioning groove, one of the at least two holders is detachably and slidably disposed between the top wall and the bottom wall of the positioning groove.

11. The clamping apparatus of claim 10, wherein each holder is formed with an opening for clipping, each of the openings of the holders has a width different from a width of the other, and each of the holders has a U-shaped appearance.

12. The clamping apparatus of claim 11, wherein a width of the opening of the seat is larger than the widths of the openings of the holders.

13. The clamping apparatus of claim 10, wherein the holders includes a holder which is formed with an opening for clipping and a holder which has a plug disposed thereon.

14. The clamping apparatus of claim 10, wherein each of the holders has a shape corresponding to a shape of the positioning groove.

15. The clamping apparatus of claim 10, wherein a thickness of either of the holders is equal to a distance between the top wall and the bottom wall of the positioning groove.

16. The clamping apparatus of claim 10, wherein the clamping apparatus further comprises a restriction structure and a cover, the cover is disposed on one end of the sheath which locates away from the seat, a receiving space is defined in the cover, the supporter is partially received in the receiving space, the stopper is movably inserted through the supporter and the vertical hole;

wherein the supporter is formed with a radial aperture, the restriction structure is disposed in the radial aperture;

wherein the stopper is formed with an annular groove, the restriction structure comprises a second elastic member and a bead, one end of the second elastic member abuts against the bead, another end of the second elastic member abuts against the cover, so that the bead is generally forced toward the stopper, motion of the stopper moving away from the seat is restricted by the bead when the bead is partially received in the annular groove.

17. The clamping apparatus of claim 10, wherein the plug which is disposed on one end of the stopper is formed with a circular protrusion, the circular protrusion defines a leakage prevention groove, a protrusion is disposed on a bottom portion of the leakage prevention groove.

* * * * *